(12) United States Patent
Haustein et al.

(10) Patent No.: US 10,452,487 B2
(45) Date of Patent: *Oct. 22, 2019

(54) DATA PROCESSING APPARATUS AND METHOD

(71) Applicant: International Business Machines Corporation, Armonk, NY (US)

(72) Inventors: Nils Haustein, Soergenloch (DE); Fabian Kuhl, Wiesbaden (DE); Christian Mueller, Dichtelbach (DE); Dominic Mueller-Wicke, Weilburg (DE); Thomas Schreiber, Klein-Winternheim (DE)

(73) Assignee: International Business Machines Corporation, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 15/440,618

(22) Filed: Feb. 23, 2017

(65) Prior Publication Data

US 2017/0161155 A1   Jun. 8, 2017

Related U.S. Application Data

(63) Continuation of application No. 14/829,117, filed on Aug. 18, 2015, now Pat. No. 9,665,439.

(30) Foreign Application Priority Data

Aug. 20, 2014   (GB) .................................. 1414750.8

(51) Int. Cl.
*G06F 11/14* (2006.01)
*G06F 16/17* (2019.01)
*G06F 16/182* (2019.01)

(52) U.S. Cl.
CPC ...... *G06F 11/1451* (2013.01); *G06F 11/1461* (2013.01); *G06F 11/1464* (2013.01); *G06F 16/1734* (2019.01); *G06F 16/182* (2019.01)

(58) Field of Classification Search
CPC ............... G06F 11/1451; G06F 16/182; G06F 16/1734; G06F 11/1464; G06F 11/1461
(Continued)

(56) References Cited

U.S. PATENT DOCUMENTS 5,642,505 A * 6/1997 Fushimi .............. G06F 11/1458
5,684,991 A * 11/1997 Malcolm ............ G06F 11/1451
707/640

(Continued)

OTHER PUBLICATIONS

Hazen et al., "GPFS HPSS Integration: Implementation Experiences", University of California, Lawrence Berkeley National Laboratory (LBNL), 2008, 13 pages. (Year: 2008).*
(Continued)

*Primary Examiner* — Phuong Thao Cao
(74) *Attorney, Agent, or Firm* — Jared L. Montanaro

(57) ABSTRACT

Operating a data processing and storage apparatus to perform continuous backup monitoring for a collection of stored file system objects. In response to changes respective to a number of the file system objects, a set of Data Management Application Program Interface (DMAPI) events is created. For each of the events, accessory file system object information relative to a file system object subject to the change is determined. The events are grouped into an event group and a unique group identifier and an overall group size count are assigned to each of the events included in the event group. The events are sent together with the respective accessory file system object information, the respective group identifier and the respective group size to a number of backup clients registered as applications. The backup clients are to process the events together with the
(Continued)

respective accessory file system object information, the respective group identifier and the respective group size into a number of backup requests.

10 Claims, 7 Drawing Sheets

(58) Field of Classification Search
USPC .................................................. 707/646, 616
See application file for complete search history.

(56) References Cited

U.S. PATENT DOCUMENTS

| | | | |
|---|---|---|---|
| 5,842,177 A * | 11/1998 | Haynes | G06Q 10/109 705/7.24 |
| 6,990,478 B2 * | 1/2006 | Loy | G06F 9/542 707/781 |
| 7,165,059 B1 | 1/2007 | Shah et al. | |
| 7,197,520 B1 | 3/2007 | Matthews et al. | |
| 7,577,998 B1 | 8/2009 | Crosbie et al. | |
| 7,620,697 B1 | 11/2009 | Davies | |
| 7,647,360 B2 | 1/2010 | Kano | |
| 7,769,723 B2 | 8/2010 | Zheng et al. | |
| 7,797,582 B1 | 9/2010 | Stager et al. | |
| 7,822,827 B2 | 10/2010 | Rietschote et al. | |
| 7,908,656 B1 | 3/2011 | Mu | |
| 8,117,162 B2 * | 2/2012 | Haselton | G06F 11/1451 707/640 |
| 8,239,880 B1 | 8/2012 | Caccavale et al. | |
| 8,380,957 B2 | 2/2013 | Prahlad et al. | |
| 8,521,694 B1 | 8/2013 | Natanzon | |
| 8,554,734 B1 | 10/2013 | Chatterjee et al. | |
| 8,639,665 B2 | 1/2014 | Berman et al. | |
| 8,667,509 B1 | 3/2014 | Caccavale et al. | |
| 8,763,015 B1 | 6/2014 | Caccavale et al. | |
| 8,825,606 B1 | 9/2014 | Zhang et al. | |
| 9,122,643 B2 | 9/2015 | Herz et al. | |
| 9,135,266 B1 * | 9/2015 | Makin | G06F 16/14 |
| 9,317,686 B1 | 4/2016 | Ye et al. | |
| 2002/0059309 A1 | 5/2002 | Loy et al. | |
| 2002/0073354 A1 | 6/2002 | Schroiff et al. | |
| 2003/0078946 A1 | 4/2003 | Costello et al. | |
| 2003/0154238 A1 * | 8/2003 | Murphy | H04L 41/00 709/201 |
| 2003/0177145 A1 * | 9/2003 | Lohn | G06F 11/0793 |
| 2004/0139125 A1 * | 7/2004 | Strassburg | G06F 11/2064 |
| 2004/0143607 A1 | 7/2004 | Beck | |
| 2004/0249904 A1 | 12/2004 | Moore et al. | |
| 2004/0250113 A1 | 12/2004 | Beck | |
| 2005/0015384 A1 | 1/2005 | Wehrman et al. | |
| 2005/0125556 A1 | 6/2005 | Curran et al. | |
| 2005/0257085 A1 * | 11/2005 | Haustein | G06F 11/1458 714/13 |
| 2006/0004597 A1 | 1/2006 | Charters et al. | |
| 2006/0218363 A1 * | 9/2006 | Palapudi | G06F 11/1451 711/162 |
| 2007/0283017 A1 * | 12/2007 | Anand | G06F 11/1458 709/226 |
| 2008/0077988 A1 | 3/2008 | Small | |
| 2008/0126441 A1 | 5/2008 | Giampaolo et al. | |
| 2008/0235299 A1 * | 9/2008 | Haselton | G06F 11/1451 |
| 2008/0275921 A1 | 11/2008 | Gunabalasubramaniam et al. | |
| 2008/0275956 A1 | 11/2008 | Saxena et al. | |
| 2009/0019456 A1 | 1/2009 | Saxena et al. | |
| 2009/0063393 A1 | 3/2009 | Saake et al. | |
| 2009/0158298 A1 | 6/2009 | Saxena et al. | |
| 2010/0023533 A1 | 1/2010 | Celi, Jr. et al. | |
| 2010/0082555 A1 * | 4/2010 | Ogawa | G06F 16/1734 707/688 |
| 2010/0223274 A1 | 9/2010 | DeHaan et al. | |
| 2011/0055293 A1 * | 3/2011 | Tevis | G06F 16/217 707/812 |
| 2013/0074100 A1 | 3/2013 | Faitelson et al. | |
| 2013/0179381 A1 | 7/2013 | Kawabata et al. | |
| 2013/0227352 A1 * | 8/2013 | Kumarasamy | G06F 11/3072 714/47.1 |
| 2013/0268493 A1 | 10/2013 | Berman et al. | |
| 2013/0282830 A1 | 10/2013 | Bensen et al. | |
| 2014/0074787 A1 | 3/2014 | Berman et al. | |
| 2014/0181047 A1 | 6/2014 | Pawar et al. | |
| 2014/0181441 A1 * | 6/2014 | Kottomtharayil | G06F 11/1458 711/162 |
| 2016/0055065 A1 | 2/2016 | Haustein et al. | |
| 2016/0170834 A1 | 6/2016 | Erickson et al. | |
| 2016/0224430 A1 | 8/2016 | Long et al. | |

OTHER PUBLICATIONS

Lu et al., "An Incremental File System Consistency Checker for Block-Level CDP Systems," Symposium on Reliable Distributed Systems, pp. 157-162, DOI 10.1109/SRDS.2008.20, IEEE Computer Society © 2008 IEEE.

Wang et al., "CB-CDP: A Cloud Based Continuous Data Protection System," Consumer Electronics, Communications and Networks (CECNet), 2013 3rd International Conference on, pp. 188-191, DOI 10.1109/CECNet/2013/6703303, © 2013 IEEE.

Examination Report for DE9-2014-0067, Application No. GB1414750.8, dated Mar. 23, 2016, 3 pgs.

Reply to Examination Report for DE920140067GB1, Application No. 1414750.8, dated Apr. 4, 2016, 1 pg.

Notification of Grant: Patent Serial No. GB2529436, dated Apr. 19, 2016, Application No. 1414750.8, 2 pgs.

Lawthers, P. "The Data Management Application Programming Interface," in Proceedings of the Fourteenth IEEE Symposium on Mass Storage System, pp. 327-335, 1995.

International Search Report for Application GB1414750.8, dated Feb. 18, 2015, pp. 1-3.

List of IBM Patents or Patent Applications Treated as Related, Feb. 22, 2017, 2 pgs.

* cited by examiner

Fig. 7

| EGS | EGID | Source Path | Target Path | Stage |
|---|---|---|---|---|

151

| EGID | DMAPI handle | Parent DMAPI handle | DMAPI Event Type | Object Type |
|---|---|---|---|---|

152

| file system object name | Backup operation |
|---|---|
| /fsroot/dir_m/dir_n/file_n | Send |
| /fsroot/dir_m/dir_n/file_m | Send |
| /fsroot/dir_m/dir_n/file_n | Expire |
| /fsroot/dir_m/dir_n/file_m | Send |

153

150

DATA PROCESSING APPARATUS AND METHOD

PRIOR FOREIGN APPLICATION

This application claims foreign priority to United Kingdom (GB) patent application number 1414750.8, filed Aug. 20, 2014; this application also claims domestic priority to U.S. patent application Ser. No. 14/829,117, filed Aug. 18, 2015. Both foreign priority and domestic priority applications are hereby incorporated herein by reference in their entirety.

BACKGROUND

One or more aspects of the invention relate to the field of computer science, and more particularly, to a data processing and storage apparatus, a method for operating a data processing and storage apparatus and to computer executable instructions on a computer-readable non-transitory storage medium for continuous data protection in distributed file systems of compute clusters.

The recent growth of data may challenge system architects and administrators in terms of data protection. Large distributed storage systems do not only store data for archiving purposes, but rather, have to deal with a high frequency of data access. For this sake, large scale distributed file systems have been developed in the past to provide for large data contents on the one hand and maximum access rate on the other hand.

A typical extension to a distributed file system is known as the "Data Management Application Program interface", often abbreviated as "DMAPI". Detailed information can be found in the document "Systems Management: Data Storage Management (XDSM) API" of February 1997, which is hereby incorporated herein by reference in its entirety. Typically, DMAPI is used for hierarchical storage management applications, like IBM's TSM (Tivoli Storage Manager) for Space Management or IBM's HPSS (High Performance Storage System).

As another extension to large scale compute clusters and distributed file systems, backup systems based on a client-server architecture are known from the prior art.

In a client-server backup architecture, the backup server manages the common backup storage resources as, for example, disk storage and tape storage, used to store the backup data. Additionally, the backup server can store global metadata and statistical information about the backup clients, the backup data and the common backup storage.

In a client-server backup architecture specifically designed for a distributed file system of a compute cluster, backup clients are typically installed in a number of the compute nodes. Then, each of the backup clients can read the entire data from the distributed file system mounted on all compute nodes in the compute cluster. For example, with the distributed file system IBM GPFS (General Parallel File System) a TSM backup client can be installed and operative on each compute node in order to perform backup to the TSM server.

Commonly known backup processing is performed in a scheduled manner. When initiated, the backup clients typically perform several steps for determining changes between file system objects and backup data.

In a "scan" step, the file system is scanned to identify files system objects that require backup. Typically, the "scan" step includes a directory tree walk or, in a more particular situation, an inode table walk.

In a subsequent "compare" step, conventional backup clients typically identify differences in the file systems objects. Typically, three types of differences are distinguished.

The first type relates to file system objects which have been newly created since the last backup. The action to be taken for new files is commonly referred to as "SEND". A backup operation of the "SEND" type will cause a backup server to add these new file system objects to the backup data.

The second type of backup operation relates to objects which have been updated objects since the last backup. The action to be taken for updated files is commonly referred to as "UPDATE". A backup operation of the "UPDATE" type will cause a backup server to update the backup data relating to these file systems objects. In some cases, backup operations of the "UPDATE" type cause the backup server to create a new version of the file system object while the previous version is still retained in the backup server.

The third type of backup operation relates to objects which have been deleted since the last backup. The action to be taken for deleted files is commonly referred to as "EXPIRE". A backup operation of the "EXPIRE" type will cause a backup server to delete the backup data for the respective file system object. In some cases, the latest versions of deleted files in the backup server are retained for a pre-defined time period until they are deleted.

After having determined the type of required backup operation for a specific file system object, the conventional backup clients will issue a backup request of the type for the respective file system object to the backup server.

Finally, the backup request will be processed by the backup server thereby bringing the backup data in a consistent state with respect to the underlying file system object.

It has to be understood, that regardless of the number of backup clients, the conventional backup architecture suffers limitations in that for certain steps at least a considerable amount of backup client allocated processing has to be performed on a single node in the compute cluster. In particular, the conventional "scan" step has to be coordinated by a single backup client in view of, for example, initially starting the "scan" step and finally collecting the results from all backup clients for comparison.

Moreover, the conventional architecture performs the "compare" step to a wide extent on a single backup client for being able to determine all changes, especially when objects have been deleted. In an exemplary situation, a first backup client running on a first compute node may not be able to assert that a specific file system object has not been detected by another backup client running on another compute node. Therefore, this file system object may not be marked for expiration by the first backup client.

By this background, it becomes clear that an increase in file system contents, namely in the number and the size of managed file system objects, may cause prior art backup operations to exceed the typical backup time slots.

As an approach for speeding-up backup operations in specific situations, journaling file systems have been proposed in the prior art. Journaling typically means to immediately track changes in file system objects to a so-called file system journal file. Even though the primary goal of journaling was crash recovery, journaling may also be used for avoiding a "scan" as explained before in the file system backup. In view of this, a major benefit of the usage of journaling for file system backup solutions may be seen in the fact that changes in data and metadata will be collected from the journaling engine and can be used as baseline information for a later backup, thereby avoiding a file system scan and determination of differences in file system objects between the last and the current backup. Consequently, journaling may be used to reduce the overall time for the file system backup. Some popular examples of journaling file systems are known as JFS, JFS2, XFS, ReiserFS, EXT2-4, VxFS.

However, journaling is not available for numerous distributed file systems on high-performance compute cluster as, for example, IBM's GPFS.

Therefore, conventional backup approaches may not take advantage of the parallelism of resources in typical high-performance compute clusters.

SUMMARY

In accordance with one aspect, a computer-implemented method is provided. The method includes creating a set of events, wherein the creating is in response to at least one change respective to a number of file system objects stored in a file system; determining for each event of the set of events accessory file system object information relative to the file system objects subject to the at least one change, an event type and a type of the file system object, the accessory file system object information including at least one of a handle of a file system object and a parent handle of a directory containing the file system object; grouping the set of events into an event group and assigning a unique group identifier and a number of elements in the event group as an overall group size to each event included in the event group; and sending the set of events together with the respective accessory file system object information, the respective group identifier and the respective overall group size to a number of backup clients registered as event listener applications, the backup clients to process the set of events together with the respective accessory file system object information, the respective group identifier and the respective overall group size into a number of backup requests.

In another aspect, a computer program product is provided. The computer program product includes a computer readable storage medium readable by a processing circuit and storing instructions for execution by the processing circuit for performing a method. The method includes creating a set of events, wherein the creating is in response to at least one change respective to a number of file system objects stored in a file system; determining for each event of the set of events accessory file system object information relative to the file system objects subject to the at least one change, an event type and a type of the file system object, the accessory file system object information including at least one of a handle of a file system object and a parent handle of a directory containing the file system object; grouping the set of events into an event group and assigning a unique group identifier and a number of elements in the event group as an overall group size to each event included in the event group; and sending the set of events together with the respective accessory file system object information, the respective group identifier and the respective overall group size to a number of backup clients registered as event listener applications, the backup clients to process the set of events together with the respective accessory file system object information, the respective group identifier and the respective overall group size into a number of backup requests.

In yet a further aspect, a computer system is provided. The computer system includes a memory and a processing device in communication with the memory, wherein the computer system is configured to perform a method. The method includes creating a set of events, wherein the creating is in response to at least one change respective to a number of file system objects stored in a file system; determining for each event of the set of events accessory file system object information relative to the file system objects subject to the at least one change, an event type and a type of the file system object, the accessory file system object information including at least one of a handle of a file system object and a parent handle of a directory containing the file system object; grouping the set of events into an event group and assigning a unique group identifier and a number of elements in the event group as an overall group size to each event included in the event group; and sending the set of events together with the respective accessory file system object information, the respective group identifier and the respective overall group size to a number of backup clients registered as event listener applications, the backup clients to process the set of events together with the respective accessory file system object information, the respective group identifier and the respective overall group size into a number of backup requests.

BRIEF DESCRIPTION OF THE DRAWINGS

Embodiments are described with reference to the attached drawings, in which:

FIG. 7 illustrates an optional journal extension to the example database layout according to FIG. 6.

DETAILED DESCRIPTION

Figure 1:
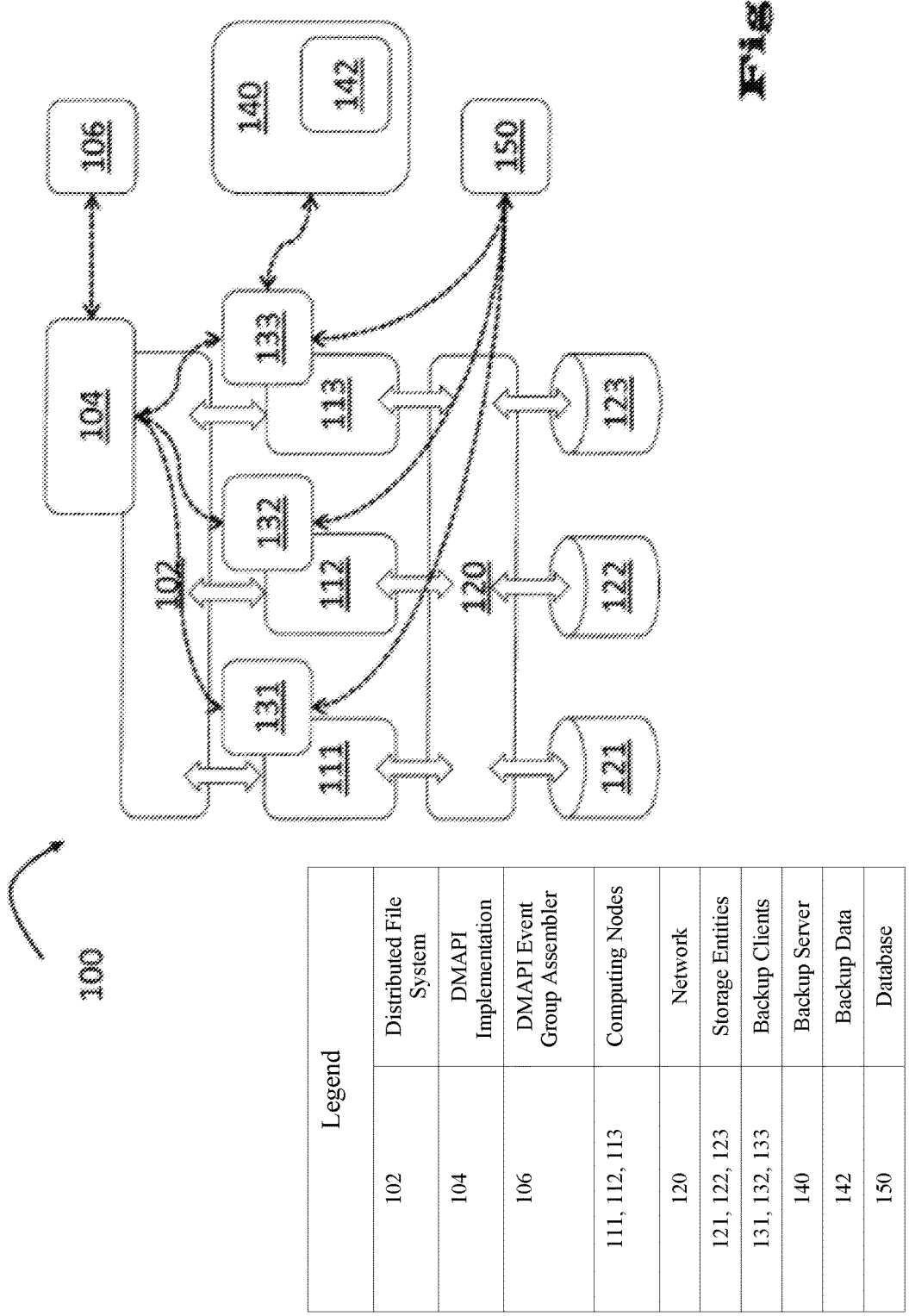
FIG. 1 shows a schematic block diagram of an example of a data processing and storage apparatus.

In summary, one or more aspects of the present invention relate to a method for operating a data processing and storage apparatus to perform continuous backup by monitoring a collection of file system objects stored in a file system, a respective data processing and storage apparatus and a respective computer program product as defined herein.

Embodiments thereof may make the backup processing more efficient and/or improve the recovery time objective because new or changed file system objects can be backed up immediately. Furthermore, the immediate backup processing may be handled separately for each file system object. As an eventual outcome thereof, backup processing may be distributed on multiple compute nodes with backup clients of the compute cluster and therefore may take advantage of the parallelism in available resources as, in particular, compute power, backup network bandwidth and storage network bandwidth.

In an embodiment, the events are DMAPI events, the implementation is a DMAPI implementation in a file system kernel, the event group assembler is a DMAPI event group assembler, the handle and parent handle are DMAPI handles and the event listener applications are DMAPI applications.

The aforementioned embodiment may be an easy implementation based on an existing DMAPI kernel extension in distributed file systems.

In an embodiment, the aforementioned processing performed by the backup clients includes:

Collecting the DMAPI events together with the respective accessory file system object information according to the respective group identifier until the respective overall group size is reached;

Determining, from the DMAPI handles and the DMAPI parent handles included in the group wise collected accessory file system object information, at least one of a source path name and a target path name, the source and/or target path name referencing to the file system objects subject to the changes;

Determining, for each group of DMAPI events, at least one of a source backup operation type and a target backup operation type to match with one in a set of available backup operation types including "SEND", "UPDATE" and "EXPIRE"; and Creating the backup requests for the DMAPI event group, for the source and/or target path names and the source and/or target backup operation type.

In an embodiment, the aforementioned determining of the backup operation types includes setting the source backup operation type to "EXPIRE" for causing a backup server to delete the file system object referenced by the source path name from the backup data, and setting the target backup type to "SEND" for causing a backup server to add the file system object referenced by the target path name to the backup data when both of the source path name and the target path name have been determined for the DMAPI event group and the respective DMAPI event group includes:

One DMAPI event of type "READ" respective to a file system object of type "FILE", Two DMAPI events of type "ATTRIBUTE" respective to file system objects of type "DIRECTORY", and One DMAPI event of type "CLOSE" respective to a file system object of type "FILE".

In an embodiment, the aforementioned determining of the backup operation types includes setting the target backup operation type to "SEND" for causing a backup server to add the file system object referenced by the target path name when only the target path name has been determined for the backup request and the respective DMAPI event group includes:

One DMAPI event of type "CREATE" relative to a file system object of type "FILE", One DMAPI event of type "ATTRIBUTE" relative to a file system object of type "DIR", and One DMAPI event of type "CLOSE" relative to a file system object of type "FILE".

In an embodiment, the aforementioned determination of the backup operation types includes setting the target backup operation type to "UPDATE" for causing a backup server to update the file system referenced by the source and target path name when both of the source path name and the target path name have been determined for the backup request and the respective DMAPI event group includes:

One DMAPI event of type "ATTRIBUTE" relative to a file system object of type "FILE"; and One DMAPI event of type "CLOSE" relative to a file system object of type "FILE".

In an embodiment, the aforementioned determination of the backup operation types includes setting the source backup operation type to "EXPIRE" for causing a backup server to expire the file object name referenced by the source path name when only the source path name has been determined and the respective DMAPI event group includes one DMAPI event of type "DESTROY" respective to a file system object of type "FILE".

In an embodiment, the aforementioned processing which is performed by the backup clients includes:

Sending the backup requests to a backup server for execution thereby causing the backup server to perform a backup operation according to the backup request; and Awaiting successful completion of the backup operation.

In an embodiment, the aforementioned processing which is performed by the backup clients further includes:

Queuing the backup requests into a backup request queue for deferred and/or scheduled execution;

Applying, where a number of the queued backup requests has the same file system object referenced by the source and/or the target path name, a replacement policy for replacing earlier backup requests by subsequent backup requests, thereby un-queuing the replaced backup requests;

Sending the remaining queued backup requests to a backup server for execution thereby causing the backup server to perform backup operations according to the backup requests; and Awaiting successful completion of the backup operations.

In an embodiment, the aforementioned application of a replacement policy includes grouping of the backup requests to be sent into a number of backup request groups, each of the backup request groups containing request backup requests relating to the same file system object thereby maintaining the queue ordering within each of the backup request groups.

In an embodiment, the aforementioned application of a replacement policy includes replacement of a preceding backup request by a subsequent backup request relative to the same file system object when:

The preceding backup request has a backup request type "UPDATE" and the succeeding backup request has a backup request type "SEND";

The preceding backup request has a backup request type "SEND" and the succeeding backup request has a request backup request type "EXPIRE";

The preceding backup request has a backup request type "SEND" and the succeeding backup request has a backup request type "SEND";

The preceding backup request has a backup request type "UPDATE" and the succeeding backup request has a backup request type "UPDATE".

In the following, a detailed description of one example of a data processing apparatus and example methods for operating the data processing and storage apparatus to perform continuous backup monitoring for a collection of file system objects stored in a file system shall be provided.

FIG. 1 illustrates one example of a compute cluster 100 as an example realization of a data processing and storage apparatus.

In instances, the compute cluster 100 can have a number of computing nodes 111, 112, 113 and a number of storage entities 121, 122, 123 as, for example, hard disk drives (HDD) and solid state drives (SSD) systems. Further, an example network 120 can be provided to allow the compute nodes 111, 112, 113 to access the storage entities 121, 122, 123. In particular, the network 120 may be configured as a Storage Area Network (SAN) or a Local Area Network (LAN) or as an equivalent technology. Component 120 illustrates the network or general data communication infrastructure that allows each of the computing nodes 111, 112, 113 to access each of the storage entities 121, 122, 123.

Additionally, the example compute cluster 100 can comprise a distributed file system 102. According to the example situation, all of the compute nodes 111, 112, 113 can be configured for accessing all storage entities 121, 122, 123. In this situation, the storage in all storage entities 121, 122, 123 can be made available to be used by the distributed file system 102.

In instances, the distributed file system 102 may be equipped with a DMAPI implementation 104. A general purpose of this DMAPI implementation 104 can be seen in providing kernel space functionality to user space applications. Accordingly, the DMAPI implementation 104 can be understood as a conventional DMAPI implementation making part of the kernel of the distributed file system 102.

Besides other known functionality, the DMAPI 104 implementation can be configured to allow applications to register in a DMAPI interface for receiving so-called DMAPI events which are designed to be indicative for particular changes occurring in the distributed file system 102. An application registered in a DMAPI interface is commonly denoted as a DMAPI application, such as backup clients 131, 132 and 133, as explained later. In instances, registration of an application as a DMAPI application can be performed specifically for the target, namely the file system object, to be monitored and the type of DMAPI events to be forwarded to that application.

Obviously, not all kinds of DMAPI events implemented by the specific DMAPI implementation 104 can occur for every file system object in the shared file system 102. Therefore, it may be foreseen to limit registering of a DMAPI application for a specific file system object to a restricted set of kinds or, more precisely, types of DMAPI events. In an example, the DMAPI implementation 104 can be configured for differentiating between file system, directory, metadata and data events. As a more detailed example, a DMAPI event occurring in monitoring the file system as a whole may be of the "MOUNT" type; a DMAPI event occurring in monitoring a directory may be of the "ATTRIBUTE" type; and a DMAPI event occurring in monitoring a conventional data file may be of the "READ" type. A "MOUNT" event, however, may not occur with respect to monitoring a data file, and therefore, registration for data file DMAPI events may exclude the event type "MOUNT".

In instances, a DMAPI event group assembler 106 can be provided as an additional component to the compute cluster 100. The DMAPI event group assembler 106, for example, can be understood as an extension to a conventional DMAPI implementation 104. Accordingly, the DMAPI event group assembler 106 can be implemented in the kernel of the distributed file system 102.

The DMAPI event group assembler 106 can be configured to assign a unique DMAPI event group identifier (EGID), briefly denoted as "group identifier", to each DMAPI event issued by the DMAPI implementation 104 in course of a file system object related operation in the distributed file system 102. More particularly, the DMAPI event group assembler 106 can be configured to assign the same EGID to all events relating to one file system object operation. For example, a file system object operation moving a file from a source directory to a target directory may include DMAPI events: READ for the file, ATTRIBUTE for the source directory, ATTRIBUTE for the target directory and a CLOSE event for the file. All these DMAPI events get the same EGID assigned by the DMAPI event group assembler 106. The event group assembler 106 may therefore utilize the process ID of a move command generating the four aforementioned DMAPI events. Additionally, the DMAPI event group assembler 106 can be configured to also provide for these DMAPI events the overall count of DMAPI events sharing the same EGID as the DMAPI event group size, EGS, briefly denoted as "group size". In particular, the group identifier and the group size can be implemented to be linked to the respective DMAPI event thereby being forwarded by the DMAPI event group assembler 106 to the DMAPI implementation 104 and from the DMAPI implementation to a number of target DMAPI applications leveraging the extended DMAPI session concept.

In the example situation, these target DMAPI applications can be understood as being spread over a number of three backup clients 131, 132 and 133 which are running on three different compute nodes 111, 112 and 113, respectively. It can be assumed for the purpose of explanation that each of the three backup clients 131, 132 and 133 is registered as a DMAPI application for DMAPI events of a specific selection of DMAPI event types but respective to all file system objects in the shared file system 102 which have to be monitored for backup. In a well-known manner, DMAPI events can be transferred between the DMAPI implementation 104 and the backup clients 131, 132, 133 via message queues which are also denoted as DMAPI sessions or, more briefly, sessions. The session concept is explained with reference to FIG. 3 in more detail.

Additionally, the compute cluster 100 can comprise a database 150. Shared access to the database 150 can be granted to all three backup clients 131, 132 and 133. Consistent sharing of the database access may be implemented by prior art techniques, and therefore, will not be discussed in detail. One purpose of the database 150 is to provide a globally shared view onto all backup related data versus the three backup clients 131, 132 and 133.

Additionally, the compute cluster 100 can comprise a backup server 140. The backup server 140 can be configured in a conventional manner for receiving backup requests from the backup clients 131, 132, 133 and to process the backup requests by changing the backup data 142 accordingly.

Finally, the distributed file system 102 can be configured to contain additional metadata for the managed file system objects. In particular, as an extended attribute for a file system object, a DMAPI managed region and a DMAPI attribute can be stored. Both are known in prior art and makeup part of a typical DMAPI implementation.

Figure 2:
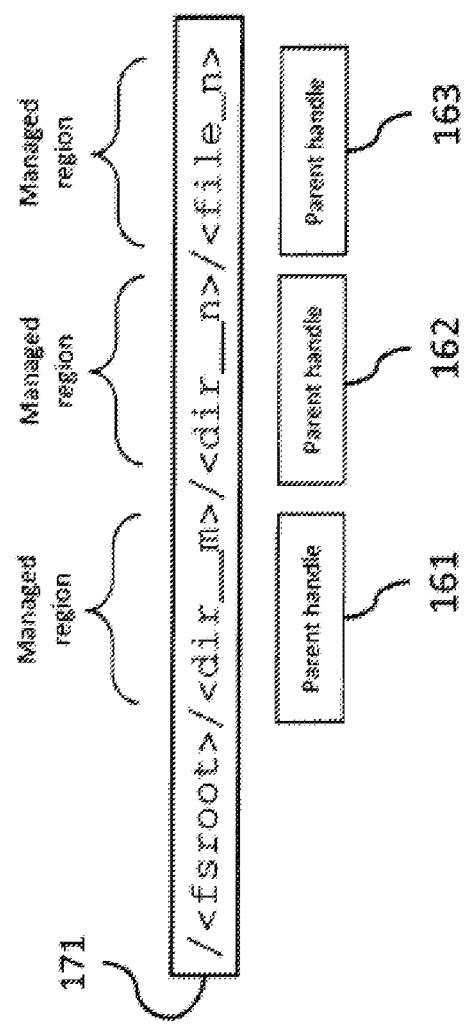
FIG. 2 illustrates an example extension to the metadata of an example file system location identifier.

An example extension to the metadata of an example file system location identifier as, for example, a path name 171 is illustrated in FIG. 2. Accordingly, each file system object, such as, for example, directories, links, normal files, can be extended by a managed region identifier. The managed region identifier may be useful to correctly catch DMAPI events relating to the underlying file system object in the DMAPI implementation 104. Further, each file system object can have a DMAPI attribute assigned to holding a DMAPI handle 161, 162, 163 to the parent directory. The combination of DMAPI file handle and the DMAPI parent handle 161, 162, 163 may be useful to recreate the entire path name 171 of the file system object in a DMAPI managed file system, as will be explained later.

Figure 3:
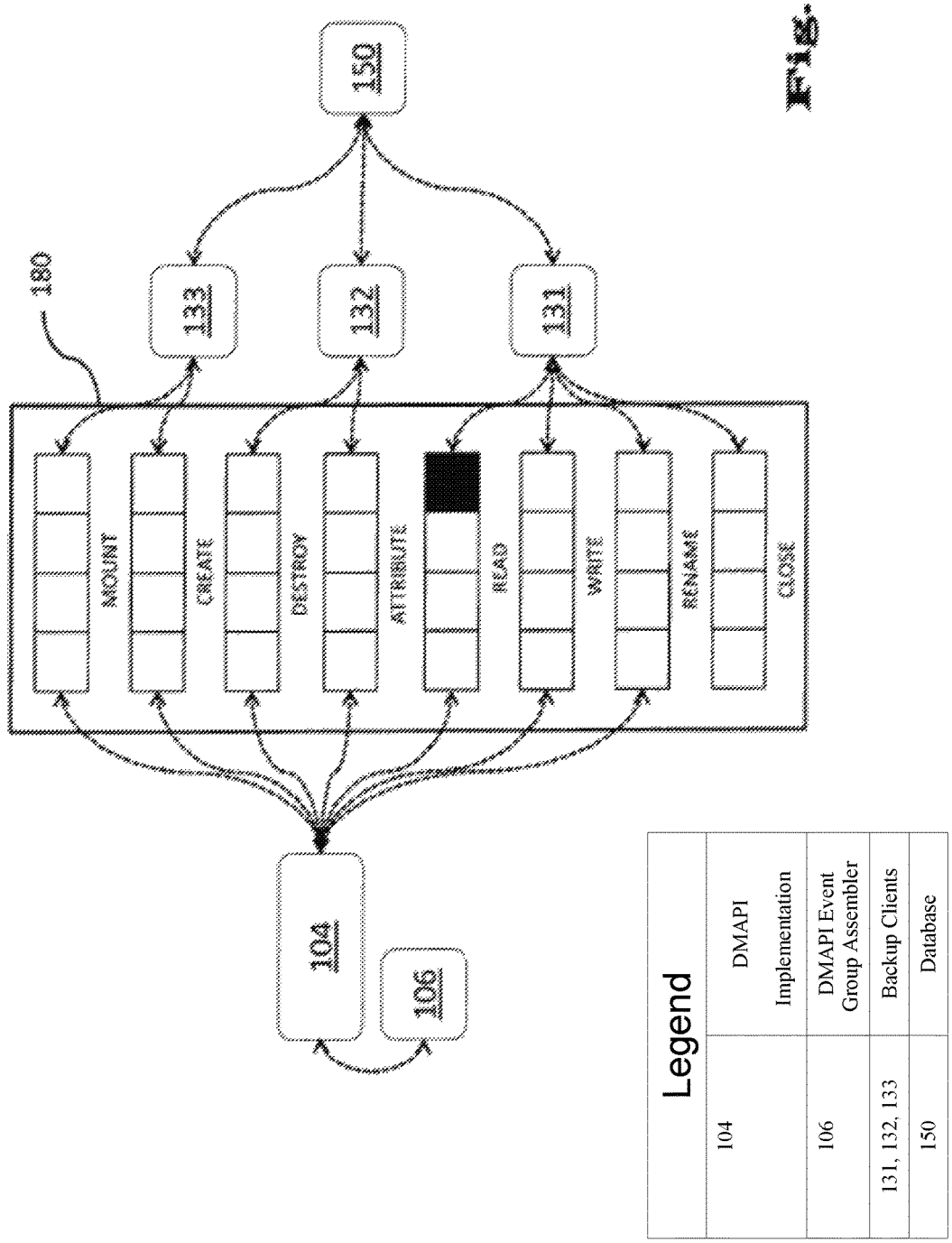
FIG. 3 provides a schematic illustration of a DMAPI session based communication.

FIG. 3 provides a schematic illustration of the session based communication between the DMAPI implementation 104 and the registered backup clients 131, 132, 133.

Each backup client 131, 132, 133 can hold several sessions 180 with the DMAPI implementation 104. Each of the sessions 180 can be established for a single dedicated event type as, for example, "MOUNT", "CREATE", "DESTROY", "ATTRIBUTE", "READ", "RENAME", "CLOSE" and "WRITE". However, there may only be one session per event type. In the example situation, the communication along the sessions may be understood as being bi-directional.

In a similar situation, an example session communication may evolve as follows. In the example distributed file system 102, a user application may access a file for reading. This will cause the kernel of the distributed file system 102 to generate a DMAPI event of the "READ" type for the file being accessed. This is indicated by the black box in the drawing.

At this point, however, it should be understood, that in a more general situation, a number of file system object changes can cause a backup requirement for a specific file system object, and therefore, DMAPI events should be caught by the DMAPI implementation 104 to a wider extent. In particular, DMAPI events relating to file system object operations, such as file or directory moves, i.e., a move from a source directory to a target directory; file or directory creation, i.e. new files; file or directory name changes, i.e., rename; file or directory copy, i.e., a copy from a source directory to a target directory; file or directory attribute changes, i.e., changes to mode, user, group, ACL, EA; and file or directory deletion, i.e. removal of a file, should be treated in the same way as the example "READ" event.

The DMAPI implementation 104 may be further configured to catch the DMAPI event at this point and to forward the DMAPI event to the DMAPI event group assembler 106 for processing.

The DMAPI event group assembler 106 may be configured to, in response to receiving the DMAPI event from the DMAPI implementation 104, assign a group identifier, EGID, and a group size, EGS, to the DMAPI event "READ". The group identifier, EGID, and group size, EGS, may be passed back to the DMAPI implementation 104 which may be configured to attach the EGID and EGS to the DMAPI event before sending it into the particular session registered for events of type "READ". In the example situation, the backup client 131 may be considered as holding this session for "READ" events, and therefore, may be expected to receive the DMAPI event and the related data. The backup client 131 may be configured to process the DMAPI event and the additional data into a backup request in database 150.

Details of one example of the layout of the database 150 will be explained with reference to FIG. 6 in the following. In a first example configuration, the database 150 comprises a first and a second table 151, 152. The first table 151 can be configured for storing information about the group size, EGS, and the group identifier, EGID, in the first two columns. In the next two columns, the first table 151 may have fields to be filled with a path name referring to a file system object, for which the event was triggered. The first field, named "Source Path", may be understood as referring to the file system object before the file system object operation was processed. The second field, named "Target Path", may be understood as referring to the file system object after the respective operation has occurred.

It should be understood that, in some situations, the "Source Path" and the "Target Path" may contain identical values as, for example, in the case of a file or a directory attribute change operation. In other situations, either the "Source Path" or the "Target Path" may remain empty as, for example, in the course of a file or a directory deletion or creation, respectively.

Additionally, in the example situation, the "Source Path" and the "Target Path" may be understood as built up from three components, namely the file system mount point as the first component, the full directory chain as the second component and the file name as the third component.

In another column of the first table 151, named "Stage", data can be stored to indicate the current stage in activity performed from the backup clients for the specified file system object. In the example situation, the "Stage" field may take one of three predefined values.

The "Stage" field may initially be set to a value "PRE-PROCESS" to indicate that a file system object change was initiated. This value may be set as the default value in a new row after being added to the first table 151. The "Stage" value may be switched to the value "PROCESS" in the backup stage to indicate that a backup client has started the backup processing for the given file system object(s) indicated by the path name(s) in this row. Afterwards, the "Stage" value may be switched to "COMPLETE" in the last stage to indicate that the backup processing has been successfully completed.

As described before, the stage value changes during backup processing until the final stage of "COMPLETED" is reached. In the example situation, rows having a "Stage" value equal to "COMPLETED" may not be deleted from the table for later audit processing. If backup tracking data is not required after backup, these rows could be deleted in an alternative implementation.

The second table 152 holds information about the event group identifier in a first column named "EGID", the DMAPI handle of the affected file system object in a second column named "DMAPI handle", the parent DMAPI handle of the affected file system object in a third column named "Parent DMAPI handle", the DMAPI event type in a fourth column named "DMAPI Event Type", and the type of the file system object in a fifth column named "Object Type".

The first column "EGID" may be understood as holding foreign keys referencing into the second column "EGID" of the first table 151. Based on this relation, a join operation may be performed for collecting data from both tables together.

The fifth column "object type" indicates the type of the file system object that generated the event. Values can be either "DIR" for directories, "FILE" for normal files or "LINK" for links.

Based on the information stored in the first and the second table 151, 152 for each event group EGID, the complex file system object operation, such as, for example, move, create, delete, copy, can be reconstructed. Based on the reconstructed file system object operation, the required backup activities can be determined. The possible event groups and the backup processing caused by the event combination are described below in detail.

Example methods for operating the example data processing and storage apparatus for performing continuous and/or scheduled backup for a collection of file system objects are explained with reference to FIGS. 4 to 9 in the following.

In particular, a rather complete explanation is given for the backup processing resulting from a complex change in the file system, namely an example move of a file from a source to a target directory. Modifications to this example situation for handling other changes in the file system will be subsequently summarized in a tabular format.

Figure 4:
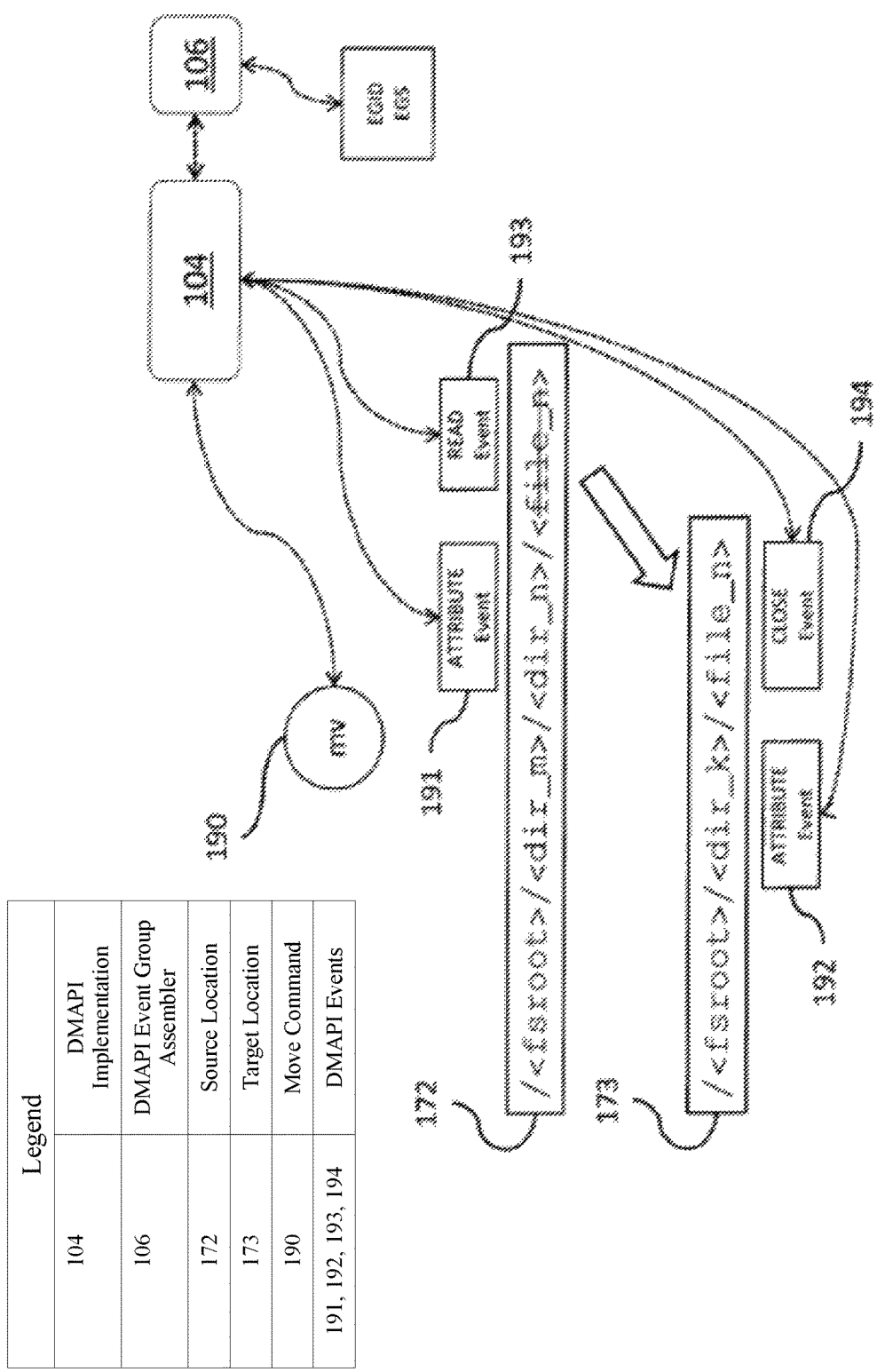
FIG. 4 illustrates a DMAPI event generated in the course of an example file move operation.

FIG. 4 illustrates a group of DMAPI events caused by a complex file system object change. For example, the file system object change includes moving a data file from a source location 172, referenced by the first path name "/throot/dir_m/dir_n/file_n", to a target location 173, referenced by the second path name "/fsroot/dir_k/file_n". In the example situation, the move operation can be understood as being caused by a command issued from a user of the file system 102, mainly according to FIG. 1. It has to be understood that a non-trivial move operation has an impact on three file system objects, namely the file to be moved, the source directory and the target directory. Therefore, in the course of a typical move operation, four DMAPI events 191, 192, 193, 194 are to be expected, as shown. This will be explained below in more detail.

Initially, the DMAPI events 191, 192, 193, 194 can be assumed to be created in the kernel of the distributed file system 102, as explained before. The DMAPI implementation 104 can be configured to catch and to forward the events 191, 192, 193, 194 to the DMAPI event group assembler 106. The DMAPI event group assembler 106 can be configured to generate and to assign a unique EGID and the correct EGS to each of the four events 191, 192, 193, 194. In a specific realization, a determination of an event group can be effected based on the process identifier referring to the process which caused the file system object change. In the example situation, namely the move command 190 sent from the file system user to the operating system. For example, the EGID may be 0001 and the EGS is 4.

Figure 5:
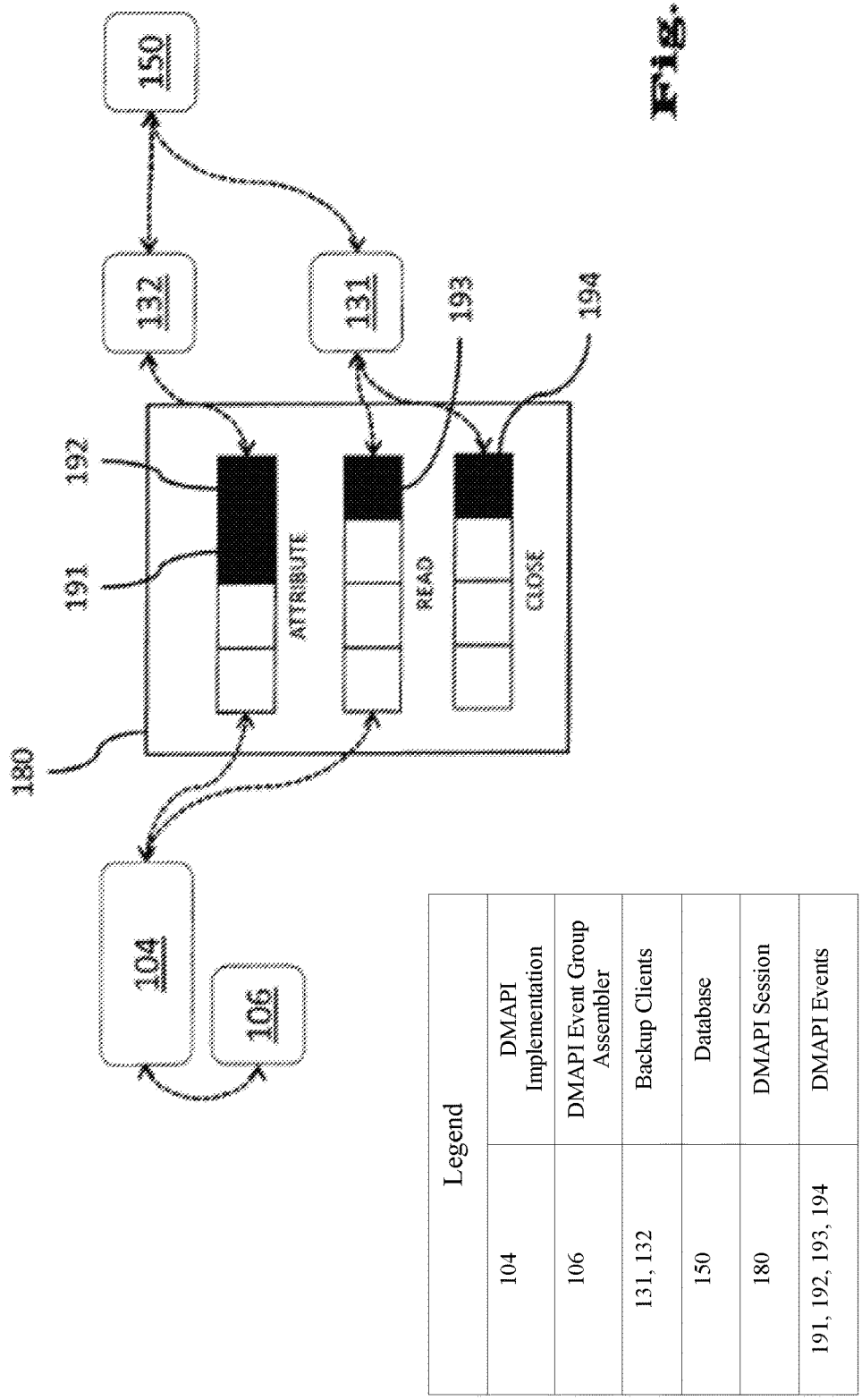
FIG. 5 illustrates processing of a group of DMAPI events according to FIG. 4 in a number of DMAPI sessions.

According to FIG. 5, the resulting information, namely the four events 191, 192, 193, 194, each thereof having an identical EGID and EGS assigned thereto, can be forwarded into a number of DMAPI sessions 180 in an example approach. The DMAPI sessions 180 can, for instance, be assumed to be held by a first and a second backup client 131, 132. For this sake, the first backup client 131 can be assumed to be registered in the DMAPI interface for at least one DMAPI event type, namely "READ" and "CLOSE", whereby the second backup client 132 can be assumed to be registered for at least one DMAPI event type, namely "ATTRIBUTE".

In the example situation, where the first backup client 131 holds a first session 180 with a "READ" event disposition, the DMAPI implementation 104 can be configured to send the DMAPI event 193 of type "READ" in this session to the first backup client 131.

Figure 6:
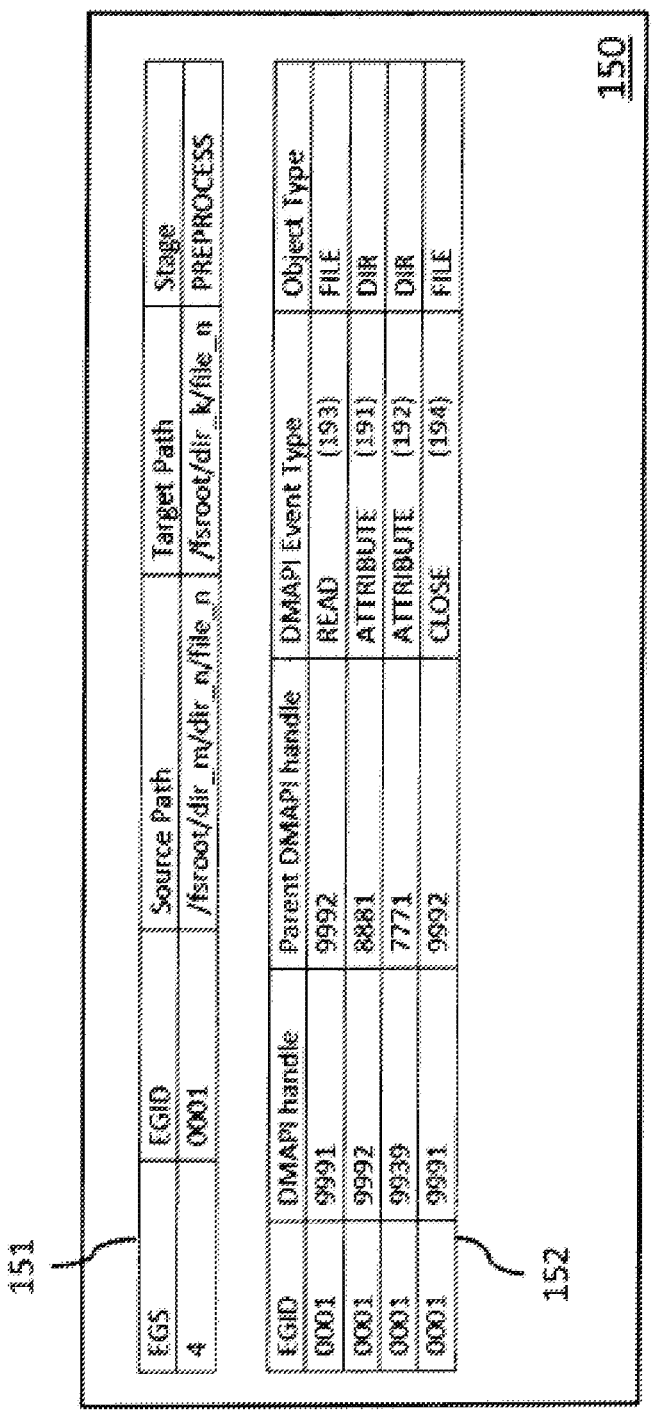
FIG. 6 illustrates an example database layout for processing DMAPI events into backup requests.

In particular, according to FIG. 6, the first backup client 131 can be configured to, responsive of receiving the DMAPI event 193, to create a new first row in table 151 thereby entering the values for the field EGS, namely "4", and the field EGID, namely "0001", which have been assigned to the DMAPI event of type "READ" by the DMAPI event group assembler 106. Furthermore, the first backup client 131 can be configured to set the field "Stage" to "PREPROCESS" in the first row of the first table 151.

Further, the backup client 131 can be configured to determine, based on the "DMAPI handle" and the "Parent DMAPI Handle" of the DMAPI event 193, the source path name 172, e.g., "/fsroot/dir_m/dir_n/file_n", and to enter this information into the field "Source Path" in the first row of table 151. This is shown in FIG. 6 in detail.

A next example step may include creating, by the first backup client 131, a new row in the second table 152, i.e. the first row, for storing the details relative to the DMAPI event 193 of type "READ".

In the example situation, in particular according to FIGS. 4 and 5, where the second backup client 132 can be assumed to hold a DMAPI session 180 with an "ATTRIBUTE" event disposition, the DMAPI implementation 106 therefore can be configured to send both DMAPI events 191, 192 of type "ATTRIBUTE" into this session 180. In the example situation, one DMAPI event 191 of type "ATTRIBUTE" relates to the source directory and the other 192 to the target directory. In the example situation, the two DMAPI events 191 and 192 have EGID of "0001" and EGS of "4" because they originate from the same file system object operation.

In the example situation and in particular according to FIG. 6, the second backup client 132 can be configured to avoid adding another row in the first table 151 for the event group of the received DMAPI events 191, 192 as a row for this event group has already been created by the first backup client 131 in the course of processing the DMAPI event of type "READ" 193. The second backup client 132 therefore can be configured to directly start to store the two DMAPI events 191, 192 by adding two rows to the second table 152 in the same way as explained before.

At this point, it should be noted, that the value, i.e. "9992", to be stored in the field "DMAPI handle" by the second backup client 132 for the first DMAPI event 191 of type "ATTRIBUTE" in the second row can be found to be identical to the value in the field "Parent DMAPI handle" as stored by the first backup client 131 for the DMAPI event 193 of type "READ" in the first row of the second table 152.

In instances, this "cross-row matching" between "DMAPI Handle" and "Parent DMAPI Handle" field data can be used for enabling the second backup client 132 to determine the correct target path name 172 to be filled into the field "Target Path" in the first table 151, as shown in FIG. 6.

In the example situation, where the first backup client 131 can be assumed to hold a second DMAPI session 180 with a "CLOSE" event disposition, the DMAPI implementation 106 therefore can be configured to send the fourth DMAPI event 194 of type "CLOSE" into this session 180, including the EGID of 0001 and EGS of 4. Then, a further step can comprise processing of the fourth DMAPI event 194 in the same way as explained before. For this sake, the first backup client 131 can be configured to avoid adding another row to the first table 151 in the same way as explained before. Therefore, the result of processing the fourth DMAPI event 194 by the first backup client 131 can include adding and filling a fourth row in the second table 152, as shown in FIG. 6.

The preprocessing of a specific group of DMAPI events may be considered as being complete for a specific event group when all DMAPI events which share the respective group identifier, EGID, have been processed into separate rows in table 152. Then, the number of rows in table 152 that have the same value as the field "EGID" in the respective row in table 151 will be identical to the value in the field "EGS" in the same row of table 151 by construction. In the example situation, the value provided in the first table 151 in the "EGS" field, namely "4", which denotes the number of elements in the event group for the group identifier given in the "EGID" field, of the same row namely "0001", matches the number of rows in the second table 152 where the value in the field "EGID" is identical to the group identifier.

The example method can additionally comprise a subsequent backup processing. In an example situation, the third backup client 133 can be configured to query the first and the second table 151, 152. In instances, this operation can be triggered to occur periodically, like every second. Alternatively, this operation may be triggered according to a more complex backup time schedule. In the course of operation, the third backup client 133 can query for rows in the first table 151 where the value in the field "EGS" is equal to an inner "count( )" operation relative to rows in the second table 152 having identical data in the "EGID" field.

As explained before, in the example situation, complete coverage of an event group in the data of the second table 152 may be understood as an indication for integrity of a backup request related to data in the respective row in the first table 151. As explained before, complete coverage may have been determined by one of the first and second backup clients 131, 132 when, for the given event group EGID, the last row has been added to the second table 152. Adding of the last row can be determined by comparing the row count in the second table 152 for the respective event group EGID with the group size EGS data in the first table 151 for this event group EGID.

In an example, the third backup client 133 can be configured to set the field "Stage" in the respective row in the first table 151 to the value "PROCESSED" to provide for a mutual exclusive entry into backup operation, when completion of an event group data occurred. Even when identical backup processing is performed by the first and/or second backup client 131, 132 at the same time, e.g. in parallel, the presence of the value "PROCESSED" will cause the first and second backup clients 131, 132 to refrain from performing duplicate processing for this respective event group.

The third backup client 133 can be configured, after having entered the mutual exclusive backup operation for the respective event group, to query the second table 152 to determine details of the required backup operation. In the example situation, the third backup client 133 can be configured for determining the complex change on the file system object which has to be reflected by the backup to be a move operation when all of the following conditions are fulfilled: The event group size EGS is equal to four; and the event group contains one DMAPI event of type "READ" on a file system object of type "FILE", two DMAPI events of type "ATTRIBUTE" on file system objects of type "DIR" and one DMAPI event of type "CLOSE" on a file system object of type "FILE". The backup operation derived by the backup client 133 based on the file system object operation "move" is a "SEND" and "EXPIRE" request, further detailed below.

The third backup client 133 can establish a connection to the backup server 140 for sending backup requests in order to cause the backup server 140 to change the backup data 142 according to the requested backup operation. In the example situation, the move of a file has to be reflected in the backup data 142 by deleting the backup image of the source file 172 and by adding a backup image for the target file 173.

Therefore, the third backup client 133 can be configured to read the data from the field "Target Path" in the respective row in the first table 151 and to send a backup request of the type "SEND" for the designated file to the backup server 140. Additionally, the third backup client 133 can be configured to read the data in the field "Source Path" from the first table 151 and to send a backup request of the type "EXPIRE" respective to the designated file to the backup server.

Additionally, the third backup client 133 can be configured to afterwards wait to receive a completion message from the backup server 140 as an indication that the backup data has been changed according to the move of the file. Responsive to receiving a similar completion message from the backup server 140, the third backup client can disconnect from the backup server 140 and can set the value in the field "Stage" in the first table 151 to the value "COMPLETE" in a suitable implementation, as can be seen particularly from FIG. 6.

It should be understood that all steps and parts of the backup processing as explained before may be performed in parallel execution by a number and even by all backup clients 131, 132, 133 which are available for the compute cluster 100. During the preprocessing step, when data is collected in the first and second table 151, 152, no duplicate operation will occur as the number of DMAPI applications is limited to only one for each DMAPI event type. Therefore, each DMAPI event will only be processed by a single backup client exclusively holding the DMAPI session for the respective DMAPI event type. In the step of creating and sending the backup requests to a backup server, no duplicate operation will occur due to the mutual exclusive access to the data in the field "Stage" in the first table 151 and the respective design of the example algorithm which has been explained before.

The specific approach for preprocessing DMAPI events caused by an example move operation can be easily generalized to other file system object operations. A number of example file system object operations are given in the table below with the respective preprocessing conditions relative to the DMAPI event group and source/target path names, as well as the backup requests to be generated.

| File system change | Preprocessing condition(s) | Backup request(s) |
|---|---|---|
| File creation | EGS value is equal to 3<br>CREATE event on FILE<br>ATTRIBUTE event on DIR<br>CLOSE event on FILE<br>Source path not existing<br>Target path existing | "SEND" request for target path name |
| Directory creation | EGS value is equal to 3<br>CREATE event on DIR<br>ATTRIBUTE event on DIR<br>CLOSE event on DIR<br>Source path not existing<br>Target Path existing | "SEND" request for target path name |
| File name change | EGS value is equal to 2<br>RENAME event on FILE<br>CLOSE event on FILE<br>Source Path existing<br>Target Path existing | "SEND" request for target path name<br>"EXPIRE" request for source path name |
| Directory name change | EGS value is equal to 2<br>RENAME event on DIR<br>CLOSE event on DIR<br>Source Path existing<br>Target Path existing | "SEND" requests for target path name, all sub-directories and files contained<br>"EXPIRE" requests for source path name, all sub-directories and files contained |
| Directory move | EGS value is equal to 4<br>READ event on DIR<br>ATTRIBUTE event on DIR<br>ATTRIBUTE event on DIR<br>CLOSE event on DIR<br>Source Path existing<br>Target Path existing | "SEND" requests for target path name, all sub-directories and files contained<br>"EXPIRE" requests for source path name, all sub-directories and files contained |
| File copy | EGS value is equal to 3<br>READ event on FILE<br>CREATE event on FILE<br>CLOSE event on FILE<br>Source Path existing<br>Target Path existing | "SEND" request for target path name |
| Directory copy | EGS value is equal to 3<br>READ event on DIR<br>CREATE event on DIR<br>CLOSE event on DIR<br>Source Path existing<br>Target Path existing | "SEND" requests for target path name, all sub-directories and files contained |

-continued

| File system change | Preprocessing condition(s) | Backup request(s) |
|---|---|---|
| File attribute change | EGS value is equal to 2<br>ATTRIBUTE event on FILE<br>CLOSE event on FILE<br>Source Path existing<br>Target Path existing | "UPDATE" request for source/target path name |
| Directory attribute change | EGS value is equal to 2<br>ATTRIBUTE event on DIR<br>CLOSE event on DIR<br>Source Path existing<br>Target Path existing | "UPDATE" request for source/target path name |
| File deletion | EGS value is equal to 1<br>DESTROY event on FILE<br>Source Path existing<br>Target Path not existing | "EXPIRE" request for source path name |
| Directory deletion | EGS value is equal to 1<br>DESTROY event on DIR<br>Source Path existing<br>Target Path not existing | "EXPIRE" request for source path name |

In an example extension thereto, the backup requests may not be executed immediately, but rather, stored in a queue to be sent to the backup server 140 for execution at a later time. In an example, the queue may be realized in the way of a third "journal" table 153 in database 150, according to FIG. 7. The journal table 153 is populated with entries by the backup clients 131, 132 and 133. The backup clients are configured in the aforementioned manner, but instead of sending a backup request to the backup server, the backup request is entered to table 153. The journal table 153 has a first column, named "File System Object Name", for holding data descriptive to the file system object. In instances, this data may be understood as the path and/or file name of the file system object subject to backup. The second column of the journal table 153, named "Backup Operation", can contain data descriptive for the type of the required backup operation. In the exemplary situation, this column may be limited to three different values, corresponding to "SEND", "UPDATE" and "EXPIRE".

According to FIG. 7, a first backup request in the first row has been queued when a first file system object, namely the data file referenced by the path name "/fsroot/dir_m/dir_n/file_n" has been created. As explained before, this backup request has the type "SEND" to cause the backup server to add the file to the backup data 142 when executed. Execution of this backup request by the backup server 140 would make the backup data 142 consistent with respect to the respective file and the respective time point in consideration.

Afterwards, in the example situation, the file system object referenced by the path name "/fsroot/dir_m/dir_n/file_n" has been renamed or moved to the file system object referenced by the path name "/fsroot/dir_m/dir_n/file_m". According to the explanations in the previous sections, this complex change may cause another backup request of type "SEND" to be queued relative to the new file system object along with and a first backup request of type "EXPIRE" for the original file system object.

In an example last step, the contents of the data file referenced by the path name "/fsroot/dir_m/dir_n/file_m" has been changed and another backup request of type "SEND" has been queued in journal table 153 to reflect this change in a subsequent backup operation.

A closer look at FIG. 7 reveals that execution of the queued backup requests is, in general, not commutative, and therefore, may not be re-ordered when relating to the same file.

For example, executing the "EXPIRE" request in the third row before executing the "SEND" request in the first row would result in an error, because there is no such backup data 142 comprising a file system object referenced by the path name "/fsroot/dir_m/dir_n/file_n" in the backup data 142. On the other hand, if the "EXPIRE" request happened after the "SEND" request, there may not be a reason to send the file system object in the first place.

As a consequence, to correctly reflect file system changes in the backup data 142 when multiple file system changes relate to the same file system object, the journal table should be designed to reflect the logical order of the underlying file system changes.

In an example situation, this may be achieved by configuring the DMAPI event group assembler 106 for creating DMAPI event group identifiers EGID which are increasing in time order of subsequent changes at least for each file. When all three tables 151, 152, 153 are managed in a relational database system, an elementary approach could be found in using a so-called automatic increasing database index ("auto key" or "counter") for this purpose.

Additionally, a deferred backup operation based on an ordered journal table 153 of FIG. 7, of backup requests as explained before may serve as a basis for another improvement in overall backup operation. Before providing a more general image of the underlying concept, an example application thereof to the situation according to FIG. 7 will be given.

In the example situation according to FIG. 7, there are four backup requests in total, two relating to a first file, designated by the path name "/fsroot/dir_m/dir_n/file_n" and another two relating to a second file, designated by the path name "/throot/dir_m/dir_n/file_m".

By application of the replacement scheme as explained before, the later "EXPIRE" request in the third row may replace the earlier "SEND" request in the first row for the same file system object. In the same way, the later "SEND" request in the fourth row may replace the earlier "SEND" request in the second row. Finally, in the example situation, the amount of backup requests to be sent to be processed by the backup server 140 has been cut in half.

A more general set of rules which allows determination of an opportunity for replacement of an earlier backup request by a subsequent backup request may be formulated as follows:

A backup request having a backup request type "UPDATE" can be replaced by a succeeding backup request having a request type "SEND" for a matching source and/or target path name;

A backup request having a backup request type "SEND" can be replaced by a succeeding backup request having a request type "EXPIRE" for a matching source and/or target path name;

A backup request having a backup request type "SEND" can be replaced by a succeeding backup request having a request type "SEND" for a matching source and/or target path name; and A backup request having a backup request type "UPDATE" can be replaced by a succeeding backup request having a request type "UPDATE" for a matching source and/or target path name.

In one example, an "EXPIRE" type backup request may not be followed by another "EXPIRE" type backup request for the same file system object because the underlying file system object is to have been deleted as a root cause for the first backup request, and therefore, could not have been manipulated again in any manner to create a second one.

This rule and similar ones may be used for consistency checking through queued requests.

Primarily, the possibility of removing requests from the queue by application of the above replacement scheme may be used for performance enhancement. In the course of replacement, in general, a remarkably lowering in the number of backup requests to be processed by the backup server 140 will occur. This may be useful in typical situations, where the (central) backup server is a "bottleneck" resource thereby limiting the speed of backup processing. Then, a remarkable decrease in backup processing time may be achieved in instances.

Further, it should be understood that the above replacement scheme may have richer performance benefits in situations where many file system objects are subject to a number of complex changes between scheduled backups.

As described herein, one aspect of the invention relates to a method for operating a data processing and storage apparatus to perform continuous backup monitoring for a collection of file system objects stored in a file system. The method includes creating, in response to changes respective to a number of the file system objects, a set of events; determining for each of the events, in a file system kernel implementation, accessory file system object information relative to the file system objects subject to the changes, the accessory file system object information including the handle of the file system object and/or the parent handle of a directory containing the file system object, the event type and the type of the file system object; grouping, by an event group assembler, the events into an event group and assigning a unique group identifier and the number of elements in the group as an overall group size to each of the events included in the event group; sending, by the implementation, the events together with the respective accessory file system object information, the respective group identifier and the respective group size to a number of backup clients registered as event listener applications; and processing, in the backup clients, the events together with the respective accessory file system object information, the respective group identifier and the respective group size into a number of backup requests.

Another aspect of the invention relates to a data processing and storage apparatus having a file system storing a number of file system objects, a DMAPI implementation, a DMAPI event group assembler and a number of backup clients, the backup clients being registered as DPMAPI applications, the data processing and storage apparatus further being configured for creating, in response to changes respective to a number of the file system objects, in the file system a set of DMAPI events; determining for each of the DMAPI events, in the DMAPI implementation, accessory file system object information relative to the file system object subject to the change, the accessory file system object information including the DMAPI handle of the file system object and/or the parent DMAPI handle of a directory containing the file system object, the DMAPI event type and the type of the file system object; grouping, in the DMAPI event group assembler, the DMAPI events into a DMAPI event group and assigning a unique group identifier and the number of group members as the overall group size to each of the DMAPI events included in the DMAPI event group; sending, by the DMAPI implementation, the DMAPI events together with the respective accessory file system object information, the respective group identifier and the respective group size to a number of backup clients registered as DMAPI applications; and processing, by the backup clients, the DMAPI events together with the respective accessory file system object information, the respective group identifiers and the respective group sizes into a number of backup requests.

A yet further aspect of the invention relates to a computer readable non-transitory storage medium comprising computer readable instructions which, when executed by a processor of a data processing and storage apparatus perform continuous backup monitoring for a collection of file system objects stored in a file system.

The above-described computer system architecture, data processing apparatus and operation methods may be implemented in digital electronic circuitry, in computer hardware, firmware, and/or software. The implementation may, for example, be a programmable processor, a computer, and/or multiple computers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of aspects of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of aspects of the invention. The embodiment was chosen and described in order to best explain the principles of aspects of the invention and the practical application, and to enable others of ordinary skill in the art to understand aspects of the invention for various embodiments with various modifications as are suited to the particular use contemplated.

What is claimed is:

1. A computer program product comprising a computer-readable non-transitory storage medium having program instructions embodied therewith, the program instructions executable by a processor to cause the processor to perform a method, the method comprising:
   creating, in response to changes respective to a number of file system objects, a set of events;
   determining for each event of said set of events, in a file system event handling implementation, accessory file system object information relative to at least one file system object subject to a change, wherein said accessory file system object information includes a handle of said at least one file system object or a parent handle of a directory containing said at least one file system object, an event type, and a type of said at least one file system object;
   grouping, by an event group assembler, the set of events into one or more event groups and for each event of a respective event group, assigning a unique group identifier of said respective event group and a number of group members in said respective event group to each event in an overall group size, wherein the overall group size is the overall number of events in said respective event group;
   sending, by said file system event handling implementation, said set of events each associated with respective accessory file system object information, a respective unique group identifier and a respective overall group size to a number of backup clients registered as event listener applications to said file system event handling implementation;
   processing, in one or more backup clients, said set of events each associated with respective accessory file system object information, a respective unique group identifier and a respective overall group size into a number of backup requests;
   sending said number of backup requests according to a source backup operation type or a target backup operation type to a backup server for execution thereby causing the backup server to perform a backup operation according to a first backup request from the number of backup requests; and awaiting successful completion of said backup operation.

2. The computer program product of claim 1, wherein said set of events are Data Management Application Program Interface (DMAPI) events, said file system event handling implementation is a DMAPI implementation in a file system kernel, said event group assembler is a DMAPI event group assembler, said handle and parent handle are DMAPI handles and said event listener applications are DMAPI applications.

3. The computer program product of claim 2, said processing performed by said backup clients comprising:
   collecting said DMAPI events together with said respective accessory file system object information according to said respective group identifier until said respective overall group size is reached;
   determining, from said DMAPI handles included in a group-wise collected accessory file system object information, at least one of a source path name and a target path name, said source path name or said target path name referencing to the at least one file system object subject to said change;
   determining, for each group of DMAPI events, at least one of a source backup operation type and a target backup operation type to match with one in a set of available backup operation types including "SEND", "UPDATE" and "EXPIRE"; and
   creating the number of backup requests for said DMAPI event group, for said source path name or said target path name and for the source backup operation type or said target backup operation type.

4. The computer program product of claim 3, wherein determining said source backup operation type and said target backup operation type comprises setting said source backup operation type to "EXPIRE" for causing a backup server to delete said at least one file system object referenced by the source path name from a backup data and setting the target backup operation type to "SEND" for causing the backup server to add said at least one file system object referenced by said target path name to the backup data when both of said source path name and said target path name have been determined for said DMAPI event group and said DMAPI event group includes:
   one DMAPI event of type "READ" respective to a file system object of type "FILE";
   two DMAPI events of type "ATTRIBUTE" respective to file system objects of type "DIRECTORY"; and
   one DMAPI event of type "CLOSE" respective to a file system object of type "FILE".

5. The computer program product of claim 3, wherein determining said source backup operation type and said target backup operation type comprises setting said target backup operation type to "SEND" for causing a backup server to add said at least one file system object referenced by said target path name to the backup data when only said target path name has been determined for the first backup request and said DMAPI event group includes:
   one DMAPI event of type "CREATE" relative to a file system object of type "FILE";
   one DMAPI event of type "ATTRIBUTE" relative to a file system object of type "DIR"; and
   one DMAPI event of type "CLOSE" relative to a file system object of type "FILE".

6. The computer program product of claim 3, wherein determining said source backup operation type and said target backup operation type comprises setting said target backup operation type to "UPDATE" for causing a backup server to update said at least one file system object referenced by said source path name and said target path name when both of said source path name and said target path name have been determined for the first backup request and said DMAPI event group includes:
   one DMAPI event of type "ATTRIBUTE" relative to a file system object of type "FILE"; and
   one DMAPI event of type "CLOSE" relative to a file system object of type "FILE".

7. The computer program product of claim 3, wherein determining said source backup operation type and said target backup operation type comprises setting said source backup operation type to "EXPIRE" for causing a backup server to expire a file system object of type "FILE" referenced by a source path name when only said source path name has been determined and said DMAPI event group includes one DMAPI event of type "DESTROY" respective to a file system object of type "FILE".

8. The computer program product of claim 1, wherein said processing being performed by said backup clients further comprises:
   queuing said backup requests into a backup request queue for deferred or scheduled execution;
   applying, where a number of said queued backup requests has a file system object referenced by both a source path name and a target path name, a replacement policy for replacing earlier backup requests by subsequent backup request thereby un-queuing said replaced backup requests;
   sending the remaining queued backup requests to a backup server for execution thereby causing the backup server to perform backup operations according to said remaining queued backup requests.

9. The computer program product of claim 8, wherein applying said replacement policy comprises grouping of the backup requests stored in said backup request queue into a number of backup request groups, each of said backup request groups containing backup requests relating to said file system object referenced by both said source path name and said target path name, thereby maintaining a queue ordering within each of said backup request groups.

10. The computer program product of claim 8, whereby applying said replacement policy comprises replacement of a preceding backup request by a subsequent backup request relative to the same file system object when:
   the preceding backup request having backup request type "UPDATE" and the succeeding backup request having backup request type "SEND";
   the preceding backup request having backup request type "SEND" and the succeeding backup request having request backup request type "EXPIRE";
   the preceding backup request having backup request type "SEND" and the succeeding backup request having backup request type "SEND";
   the preceding backup request having backup request type "UPDATE" and the succeeding backup request having backup request type "UPDATE".

* * * * *